Feb. 21, 1956  J. F. STRUEMPH  2,735,197
TIMBER RAKE ATTACHMENT
Filed May 1, 1950  3 Sheets-Sheet 1
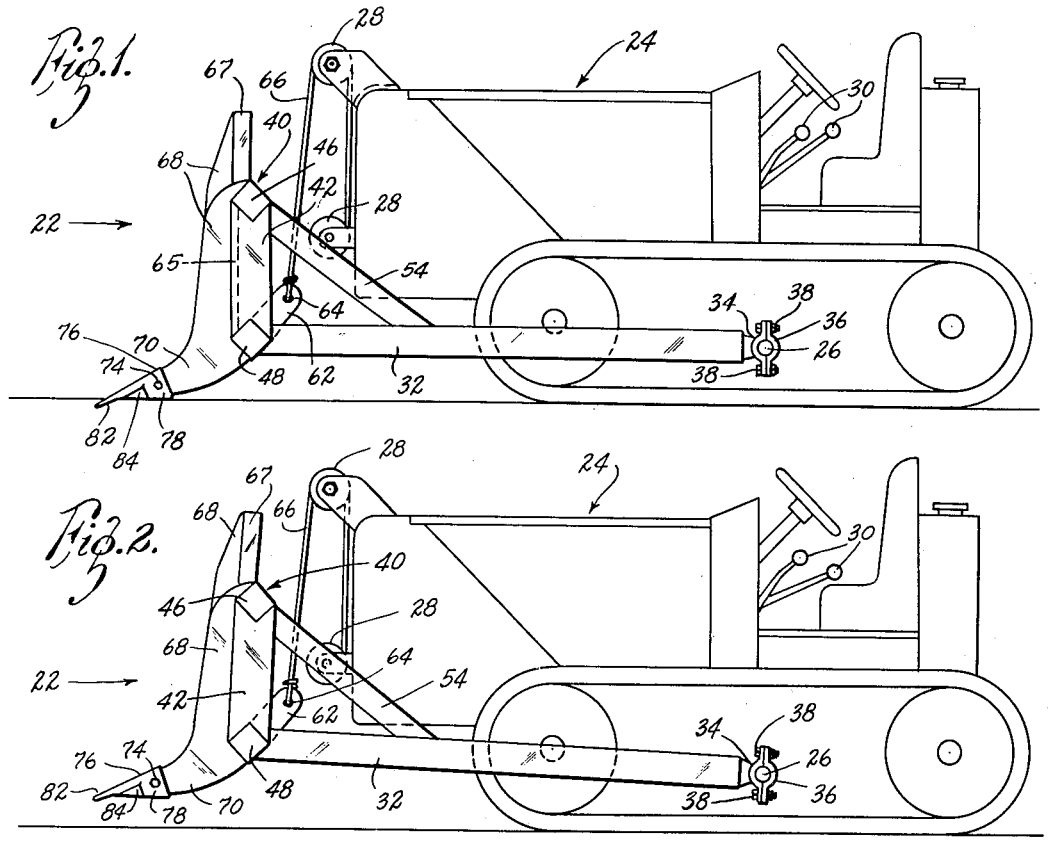
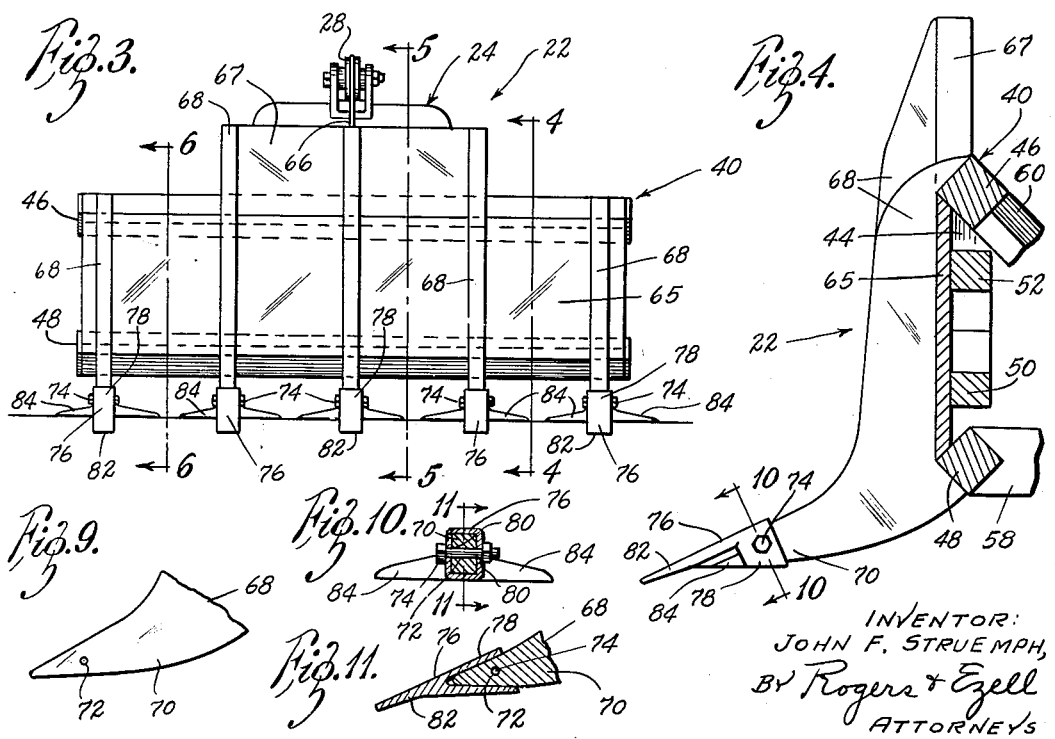
INVENTOR:
JOHN F. STRUEMPH,
BY Rogers + Ezell
ATTORNEYS

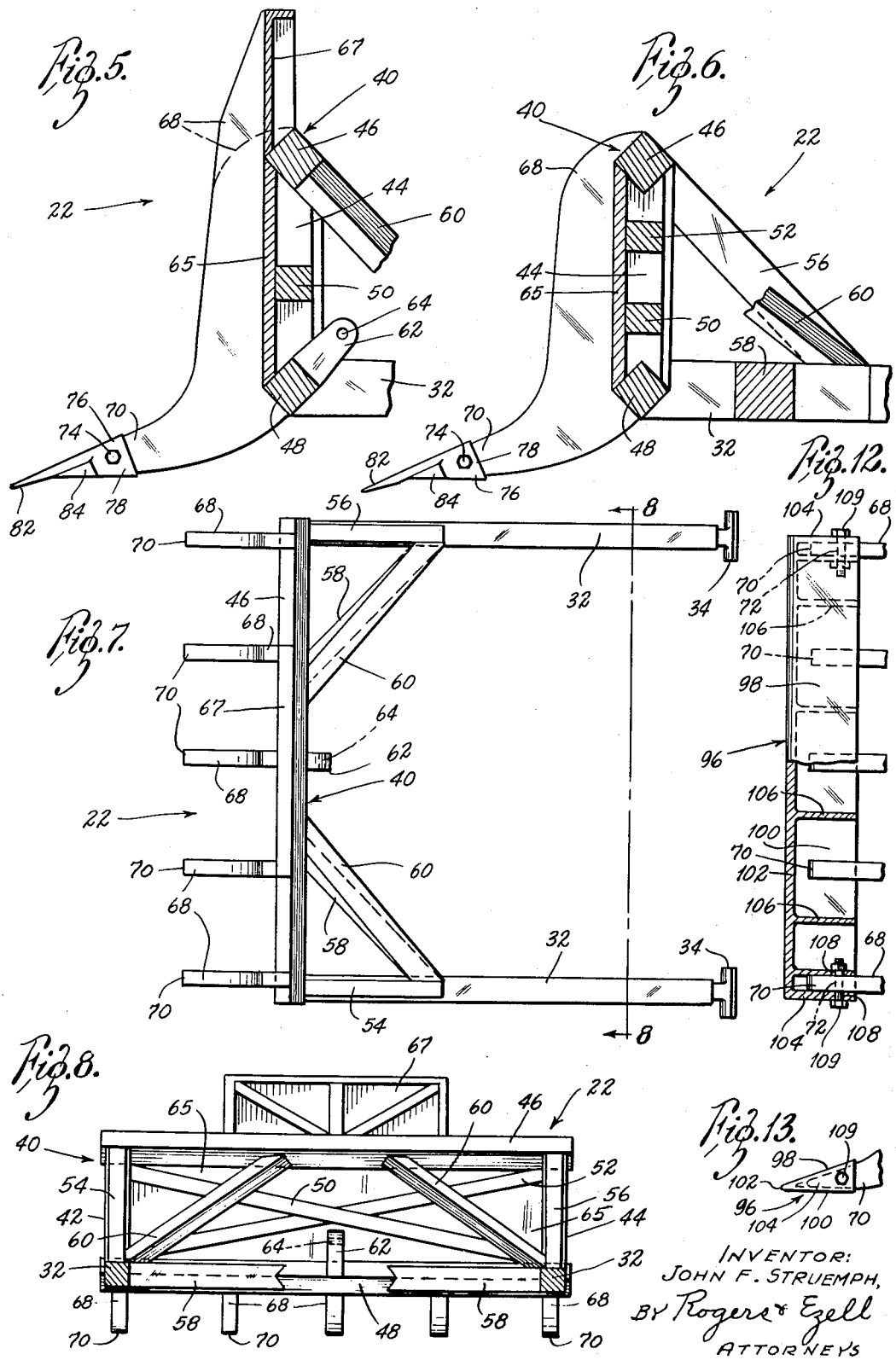

Feb. 21, 1956 J. F. STRUEMPH 2,735,197
TIMBER RAKE ATTACHMENT
Filed May 1, 1950 3 Sheets-Sheet 3
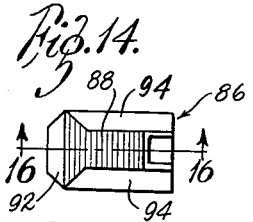
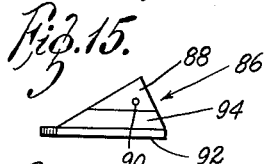
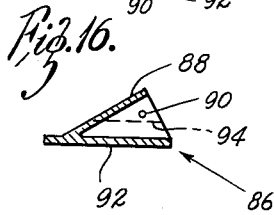
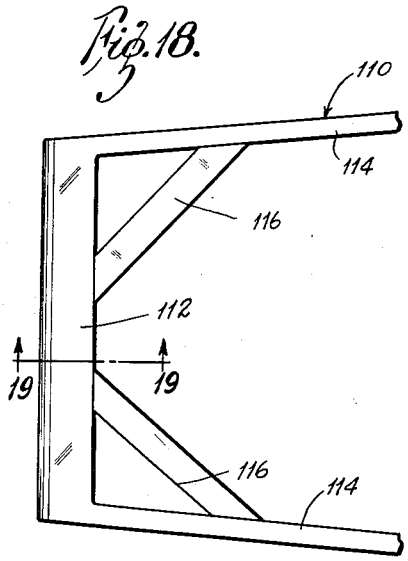
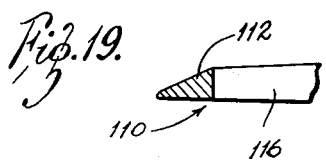
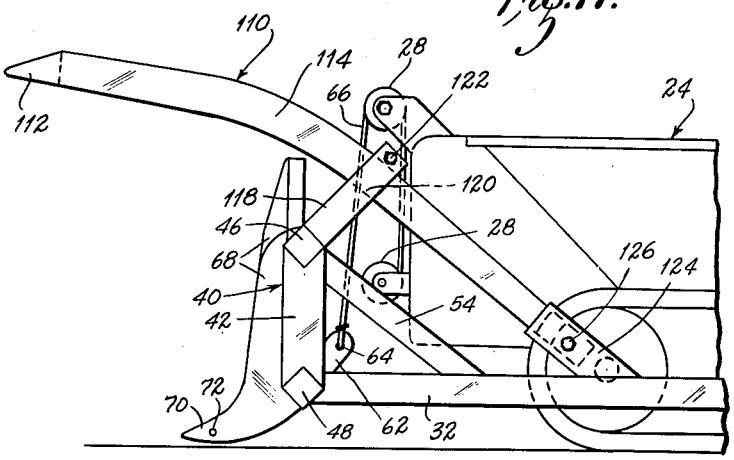
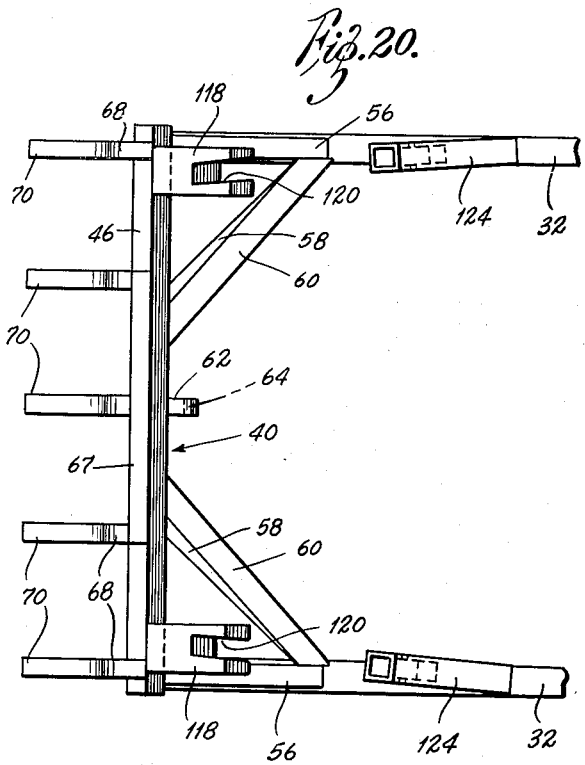
INVENTOR:
JOHN F. STRUEMPH,
BY Rogers & Ezell
ATTORNEYS United States Patent Office 2,735,197
Patented Feb. 21, 1956

2,735,197

TIMBER RAKE ATTACHMENT

John F. Struemph, Vienna, Mo.

Application May 1, 1950, Serial No. 159,240

4 Claims. (Cl. 37—2)

The present invention relates generally to the ground clearing art, and more particularly to a novel timber rake attachment for tractors and the like, particularly those of the Caterpillar type.

In one form, the attachment includes a yoke-like member containing side bars adjacent its ends for pivotally and removably fastening it to a tractor or the like. A covering is fastened to the front of the yoke-like member and a shield-like member extends upwardly above the upper edge of the yoke-like member adjacent the center thereof to protect the front end of the tractor and its operator from the ends of trees being raked which tend to slide over the top of the yoke-like member. A series of spaced J-shaped teeth are fastened to the covering and extend from adjacent the top of the yoke-like member downwardly and forwardly to below said member. The body of the teeth extends in front of the covering so as to provide a series of channels through which the dirt and small stones can pass. Shoes of various shapes, or an elongated member, are removably fastened to the ends of the teeth, the construction of the shoes being dependent on the type and size of material being raked.

Another form of the device is similar to that described above, but, in addition, includes a removable beam-like member which extends above the yoke-like member a predetermined distance in front of the teeth.

The different rake attachments in use at the present time are not completely satisfactory. Most of them do not stand up under heavy usage and are battered and bent out of shape when an attempt is made to rake the larger trees.

Furthermore, none of them, to applicant's knowledge, contains any means for protecting the front end of the tractor, particularly the radiator, and the operator from the ends of trees which ride over the top of the yoke-like member. Because of this deficiency, the radiators of many tractors have been broken and operators have suffered serious injuries because they could not stop the tractor in time when the end of a tree being raked slipped over the top of the yoke-like member.

It is an object of the present invention, therefore, to provide a novel rake attachment for tractors and the like which is of sturdy construction so as to remain in operation without maintenance for long periods of time when used for handling heavy timber.

Another object is to provide a timber rake attachment which contains a shield-like portion to protect the front of the tractor and its operator from the ends of trees which tend to ride up over the top of the yoke-like member.

Another object is to provide a timber rake attachment which contains a series of spaced teeth having their front edges disposed in front of the yoke-like member so that the dirt and small stones will easily fall downwardly between them.

Another object is to provide a timber rake attachment which contains a series of spaced teeth which extend downwardly and forwardly below the lower edge of the yoke-like member so that dirt and small stones will not pile up against the latter.

Another object is to provide a timber rake attachment which contains a series of removable shoes of different shapes and sizes for attachment to the lower ends of the teeth so that the device can be alternately used for raking either small or large trees or for raking stones.

Another object is to provide a timber rake attachment which contains an elongated member removably attached to the lower ends of the rake teeth whereby the attachment can be used for driving down small trees.

Another object is to provide a timber rake attachment which contains a removable boom extending above and forwardly of the teeth for use in cooperation with the teeth for driving down and moving large trees.

Another object is to provide a timber rake attachment which can be removed and attached to a tractor in a relatively short time by inexperienced personnel.

Further objects and advantages of the present invention will be apparent from the following description, reference being had to the accompanying drawings wherein a preferred embodiment of the present invention is shown, in which:

Fig. 1 is a side elevational view of a timber rake attachment constructed in accordance with the teachings of the present invention, shown with a Caterpillar type tractor; the attachment being in the lowered or operative position;

Fig. 2 is a view similar to Fig. 1 but with the attachment shown in the raised or inoperative position;

Fig. 3 is a front elevational view of the attachment shown provided with shoes which are used for raking small trees;

Fig. 4 is an enlarged fragmentary vertical transverse sectional view taken on the line 4—4 in Fig. 3;

Figs. 5 and 6 are enlarged fragmentary vertical transverse sectional views taken on the lines 5—5 and 6—6, respectively, in Fig. 3;

Fig. 7 is a top plan view of the attachment shown removed from the tractor with the shoes removed from the ends of the teeth;

Fig. 8 is a vertical transverse sectional view taken on the line 8—8 in Fig. 7 showing the rear of the attachment;

Fig. 9 is a fragmentary side elevational view of the tip of one of the teeth, shown without a shoe;

Fig. 10 is a transverse sectional view taken on the line 10—10 in Fig. 4;

Fig. 11 is a fragmentary longitudinal sectional view taken on the line 11—11 in Fig. 10;

Fig. 12 is a top plan view of the elongated unitary shoe for driving down small timber, shown partially in section;

Fig. 13 is an end view of the member shown in Fig. 12;

Fig. 14 is a bottom plan view of a shoe for raking large stones;

Fig. 15 is a side elevational view of the shoe shown in Fig. 14;

Fig. 16 is a vertical longitudinal sectional view taken on the line 16—16 in Fig. 14;

Fig. 17 is a side elevational view of a modified form of timber rake attachment containing a removable boom for driving down large trees;

Fig. 18 is a fragmentary top plan view of the boom;

Fig. 19 is a vertical transverse sectional view taken on the line 19—19 in Fig. 18; and Fig. 20 is a fragmentary top plan view of the modified timber rake attachment with the boom removed.

Referring to the drawings more particularly by reference numerals, specifically Figs. 1 through 14, 22 indicates generally a timber rake attachment constructed in accordance with the teachings of the present invention, shown fastened to a Caterpillar type tractor 24. Manifestly, the attachment can also be used with other types of prime movers having the desired power, weight and mobility.

As shown in Figs. 1 and 2, the tractor 24 contains a pair of trunnions 26 which project laterally from the sides thereof approximately midway between the front and rear wheels. Cable winding drums 28 for raising and lowering the attachment 22 are located adjacent the front end of the tractor 24 and are controlled by a set of levers 30 in the operator's compartment. It is to be understood that the drums and cable are merely illustrative of one type of lowering and raising means, and that hydraulic means could also be used without departing from the spirit of the invention.

The attachment 22 includes a pair of side bars 32 which are pivotally and removably mounted in the trunnions 26. Fastened to the ends of the side bars 32 are brackets 34 which contain a curved bearing surface to receive the trunnions 26. Disposed on the opposite sides of the trunnions 26 so as to completely surround them are complementary brackets 36 which are removably fastened to the brackets 34 by bolts 38.

Fastened across the front ends of the side bars 32 is a framework or yoke 40 which contains vertical side members 42 and 44, a horizontal top member 46, a horizontal bottom member 48, and diagonal members 50 and 52. The member 50 is a one-piece brace while member 52 is in two pieces, as appears in Fig. 8, and is connected by welding to member 50. As shown most clearly in Figs. 4 to 6, each of the horizontal members 46 and 48 is positioned so that its edges lie in horizontal and vertical planes which intersect at its center to provide a maximum dimension in the directions of greatest potential stress.

The yoke 40 is braced by members 54 and 56 (Figs. 7 and 8) which extend diagonally forwardly from the top of the side bars 32 to the top of the vertical side members 42 and 44, respectively. Diagonal bracing members 58 extend from the inside of the side bars 32 inwardly to the horizontal bottom member 48 and additional bracing members 60 extend from the side bars 32 upwardly and inwardly to the horizontal top member 46.

Fastened to the horizontal bottom member 48 adjacent the center thereof is a bracket 62 containing an opening 64 to receive the end of a cable 66 which is played over the cable winding drums 28.

A flat rectangular-shaped plate 65 is fastened to the front of the yoke 40 so as to completely cover the same and prevent the ends of the trees being raked from protruding therethrough. Manifestly, this could also be made in the form of strips.

Extending upwardly from the top of the yoke member 40 adjacent the center thereof is a rectangular-shaped reinforced shield 67. The shield 67 is of sufficient height and width to protect the front end of the tractor 24 and its operator from the ends of trees being raked which tend to ride up over the top of the yoke 40.

Fastened to the front surface of the plate 65 and the horizontal top and bottom members 46 and 48, are a series of spaced vertically extending J-shaped rake teeth 68. As shown in Figs. 3 and 4, the center teeth extend upwardly in front of the shield 67 so as to reinforce it. The forward edges of the teeth 68 extend well in front of the plate 65 (Fig. 7) to provide a series of adjacent chutes or channels for the dirt to drop through. Also, the downwardly and forwardly curving front edges of the teeth 68 cause the trees being raked to ride upwardly a short distance on the yoke 40 so that they can be more easily carried with the attachment.

As shown in Figs. 4 to 6, the teeth 68 extend downwardly below the bottom of the yoke 40 and contain forwardly extending bottom portions of prongs 70. Because the prongs 70 extend well below the yoke 40, the dirt and small stones pass between the teeth and under the yoke and do not pile up against the plate 66 as happens when a bulldozer type blade is used for raking. Furthermore, the distance between the prongs is such that lumps of heavy clay soil break and pass between them.

Each prong 70 contains an opening 72 adjacent its end (Fig. 9) to receive a bolt 74 (Fig. 4) for removably fastening shoes of various shapes and sizes to the ends of the rake teeth 68.

One type of shoe 76 is shown in Figs. 4, 10 and 11. It includes a hollow triangular-shaped body portion 78 adapted to fit snugly on the end of the prong 70 and contains aligned openings 80 in each side thereof to receive the bolt 74. A flange-like portion 82 extends forwardly from the closed end of the body portion 78. Extending outwardly from each side of the body portion 78 are elongated fins 84 of triangular cross section. The fins 84 are made of various lengths, being longer when the device is used for raking small trees than when used for raking large trees. The bare prongs 70 can also be used for raking large trees, but it is preferable to use the removable shoes as these can be easily replaced or rebuilt when they become worn.

For moving large stones and the like, shoes 86 are used. As shown in Figs. 14 to 16, each of these shoes includes a hollow triangular-shaped body portion 88 which contains aligned openings 90 in the side walls thereof to receive the bolt 74. The lower wall of the shoe 86 is in the form of a rectangular-shaped plate 92 which extends transversely beyond the side walls of the body portion 88. The front end of the plate 92 is rounded and extends a short distance beyond the tip of the body portion 88. Reinforcing members 94 extend upwardly and outwardly from the side walls of the body portion 88 to the side edges of the plate 92.

Manifestly, these shoes can be interchanged easily and quickly by merely removing and replacing the bolts 74.

When the attachment 22 is to be used for driving down small trees, the individual shoes are replaced with an elongated trough-like member 96. As shown in Figs. 12 and 13, the member 96 has an elongated top wall 98 and an elongated bottom wall 100 which are joined together to form a forward edge 102. The angle between the two walls 98 and 100 is such that the member 96 fits snugly on the ends of the prongs 70. Triangular-shaped end walls 104 fasten together the top and bottom walls adjacent their ends, and partitions 106 are spaced between the end walls at predetermined intervals to make the structure more rigid. The partitions nearest the end walls are spaced immediately adjacent the inner surfaces of the end prongs 70, and they and the end walls 104 contain aligned openings 108 to receive bolts 109 for movably fastening the member 96 to the outermost prongs 70. If desirable, the two partitions nearest the center of the member 96 can be spaced close together whereby they can be fastened to the center prong 70 in like manner.

A modified form of attachment is shown in Figs. 17 to 20. It differs from the construction previously described in that a U-shaped boom 110 is removably fastened to the yoke 46 and the side bars 32.

The boom 110 includes a transverse member 112 of triangular cross section (Fig. 19) and slightly curved leg members 114 at each end thereof. Cross braces 116 extend between the transverse member and the upper ends of the leg members 114.

Mounted on the top of the yoke 40 at each end is a bifurcated bracket 118 (Fig. 17) which extends upwardly and rearwardly and which contains a vertically extending slot 120 of a size to receive a leg member 114.

Bolts 122 extend transversely through the upper ends of the bifurcated portion of the brackets 118 above the leg member 114 to maintain the latter in position without weakening them.

Extending upwardly and forwardly from each of the side bars 32 approximately midway between their ends are socket members 124 which receive the ends of the leg members 114. Bolts 126 pass transversely through the side walls of the socket members 124 and the ends of the leg members 114 to hold the latter in position.

The boom 110 is used in combination with the rake teeth 68 to simultaneously fell the trees and tear them loose from their embedded roots. Thus, as a tree is being driven down by the transverse member 112 of the boom, the rake teeth 68 engage the exposed stump end of the tree, tearing it loose from its roots and lifting it out of the hole in one continuous movement, thereby taking advantage of the forward momentum of the falling tree.

Furthermore, the boom prevents the bushy type of timber from building up in front of the rake and falling backwards onto the tractor.

Thus, it is apparent that there has been provided a novel timber rake attachment which fulfills all of the objects and advantages sought therefor.

The shield 67 extends upwardly above the top of the yoke 40 so as to deflect the ends of the trees being raked which tend to ride up over the yoke 40 and against the radiator of the tractor or its operator.

The front edges of the raking teeth 68 extend in front of the plate 65 and the lower ends of the teeth extend well below the bottom of the yoke 40 so that there is practically no chance of dirt and small stones piling up against the yoke 40.

The attachment can be easily and quickly removed by inexperienced personnel by merely removing the bolts 38 and disconnecting the cable 66.

The shoes of various shapes can be easily and quickly changed so that the rake can be used for moving small trees, large trees or boulders, or the elongated member 96 can be used to drive down small trees.

The modified form contains a removable boom which is used in combination with the rake teeth to simultaneously drive down the tall trees and tear the lower ends loose from their embedded roots.

Furthermore, the entire attachment is substantially reinforced throughout so that it can withstand rough usage for long periods of time without requiring repair work of any appreciable nature.

It is to be understood that the foregoing description and the accompanying drawings have been given only by way of illustration and example and that changes and alterations in the present disclosure, which will be readily apparent to one skilled in the art, are contemplated as within the scope of the present invention, which is limited only by the claims which follow.

What is claimed is:

1. A timber rake attachment for tractors and the like, comprising a yoke-like member; side bars fastened adjacent the ends of said member for pivotally fastening it to a tractor whereby it extends transversely in front thereof; a series of spaced teeth extending downwardly and forwardly from the lower edge of said yoke-like member; a boom-like member including a transverse element and leg elements removably fastened to the yoke-like member and the side bars; bifurcated brackets extending upwardly from adjacent the ends of the yoke-like member to receive the leg elements; and socket-like portions on the side bars to receive the ends of the leg elements, the transverse element extending above the yoke-like member and a predetermined distance in front of the teeth so that a tree being driven down by the boom-like member will fall to a predetermined angle before the root end thereof is engaged by the teeth.

2. A timber rake attachment for tractors and the like, comprising a yoke-like member; side bars fastened adjacent the ends of said member for pivotally fastening it to a tractor whereby it extends transversely in front thereof; a covering member fastened to the front of the yoke-like member to prevent the ends of trees from passing therethrough; a series of spaced elongated teeth fastened to the front of the covering member, said teeth extending from adjacent the top of the covering member downwardly and forwardly to below the bottom of said member, the forward edges of the teeth extending in front of the front surface of the covering member so that dirt and small stones can fall downwardly between the teeth; a boom-like member including a transverse element and leg elements removably fastened to the yoke-like member and the side bars; bifurcated brackets extending upwardly from adjacent the ends of the yoke-like member to receive the leg elements; and socket-like portions on the side bars to receive the ends of the leg elements, the transverse element extending above the yoke-like member and a predetermined distance in front of the teeth so that a tree being driven down by the boom-like member will fall to a predetermined angle before the root end thereof is engaged by the teeth.

3. A timber rake attachment for tractors and the like, comprising a yoke-like member; side bars fastened adjacent the ends of said member for pivotally fastening it to a tractor whereby it extends transversely in front thereof; a covering member fastened to the front of the yoke-like member to prevent the ends of trees from passing therethrough; a series of spaced elongated teeth fastened to the front of the covering member, said teeth extending from adjacent the top of the covering member downwardly and forwardly to below the bottom of said member, the forward edges of the teeth extending in front of the front surface of the covering member so that dirt and small stones can fall downwardly between the teeth; an elongated member removably fastened to the ends of the teeth; a boom-like member including a transverse element and leg elements removably fastened to the yoke-like member and the side bars; bifurcated brackets extending upwardly from adjacent the ends of the yoke-like member to receive the leg elements; and socket-like portions on the side bars to receive the ends of the leg elements, the transverse element extending above the yoke-like member and a predetermined distance in front of the teeth so that a tree being driven down by the boom-like member will fall to a predetermined angle before the root end thereof is engaged by the elongated member carried by the teeth.

4. A timber rake attachment for tractors and the like, comprising a yoke-like member; means for pivotally fastening said member to a tractor whereby it extends transversely in front thereof; end teeth and a series of interiorly spaced teeth tapering forwardly of the tractor and fastened to the yoke-like member so as to extend from one side of said yoke-like member to the other side downwardly and forwardly therefrom; and a straight elongated member having means for removably fastening it to said end teeth, said elongated member extending from one side to the other of said yoke-like member and including two forwardly tapering elongated plate-like elements fastened together at their front edges to provide a V-shaped cross section conforming to said tapered teeth, said fastening means comprising an end wall and a partition wall on said elongated member for fastening it to the end teeth of the yoke-like member in a close-fitting relationship, and interiorly spaced partition elements fastened at predetermined intervals between said plate-like elements and spaced from said interior teeth.

References Cited in the file of this patent

UNITED STATES PATENTS

| 941,224 | Bethune | Nov. 23, 1909 |
| 1,149,102 | Webster | Aug. 3, 1915 |
| 1,233,574 | Hemme | July 17, 1917 |
| 1,655,135 | Crawford | Jan. 3, 1928 |
| 1,692,342 | Miller | Nov. 20, 1928 |
| 1,772,624 | Brendlin | Aug. 12, 1930 |
| 1,796,737 | Van Buskirk | Mar. 17, 1931 |
| 1,856,706 | Holcomb | May 3, 1932 |
| 2,081,192 | Allin et al. | May 25, 1937 |
| 2,173,406 | Wilkinson | Sept. 19, 1939 |

(Other references on following page)

UNITED STATES PATENTS

| | | |
|---|---|---|
| 2,222,071 | Gustafson | Nov. 19, 1940 |
| 2,281,928 | Fletcher | May 5, 1942 |
| 2,295,458 | Edwards | Sept. 8, 1942 |
| 2,304,282 | Ross | Dec. 8, 1942 |
| 2,309,223 | Staring | Jan. 26, 1943 |
| 2,371,549 | Sembler et al. | Mar. 13, 1945 |
| 2,396,652 | Heilman | Mar. 19, 1946 |
| 2,427,651 | Baer | Sept. 23, 1947 |
| 2,450,905 | Mork | Oct. 12, 1948 |
| 2,491,208 | Price | Dec. 13, 1949 |
| 2,625,870 | Peacock et al. | Jan. 20, 1953 |